L. Reese,
Wind Wheel,
Nº 47,039.  Patented Mar. 28, 1865.
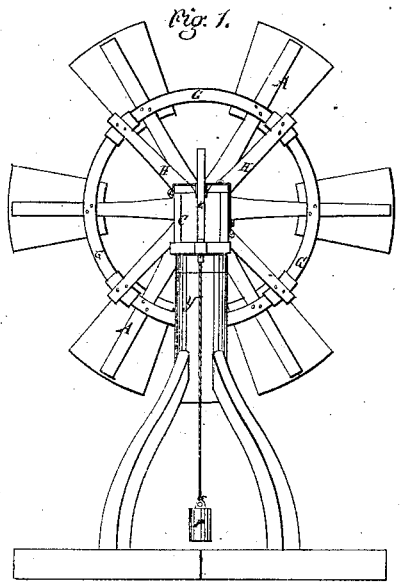
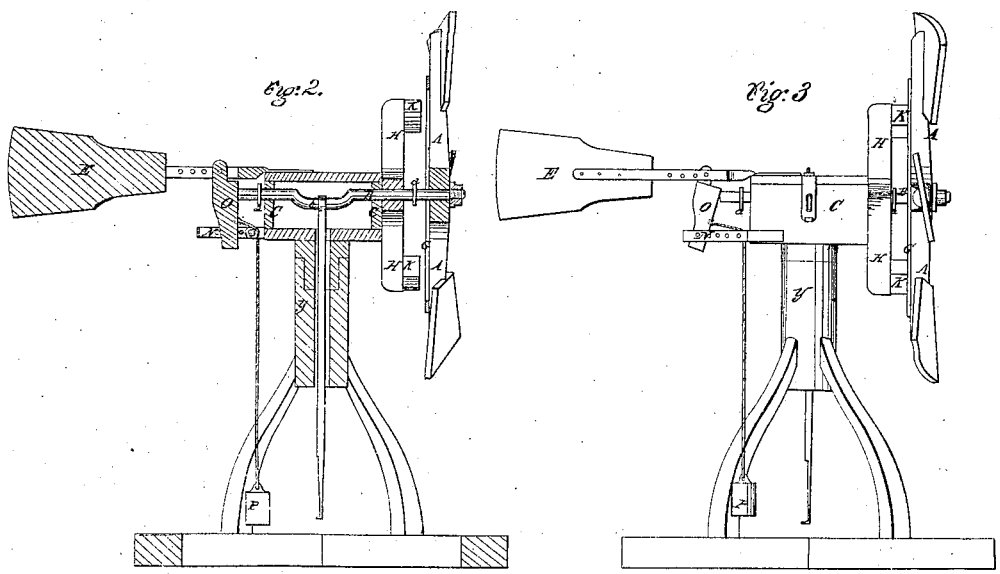
Witnesses  Inventor.

UNITED STATES PATENT OFFICE.

LEWIS REESE, OF ROLLING PRAIRIE, INDIANA.

IMPROVEMENT IN WIND-WHEELS.

Specification forming part of Letters Patent No. 47,039, dated March 28, 1865.

*To all whom it may concern:*

Be it known that I, LEWIS REESE, of Rolling Prairie, in the county of La Porte and State of Indiana, have invented a new and useful Improvement in Self-regulating Windmills; and I do hereby declare that the following is a full, clear, and exact description thereof, reference being had to the accompanying drawings, forming a part of this specification, in which—

Figure 1 is a rear elevation of my improved windmill; Fig. 2, a vertical section through the same in the line $x\ x$ of Fig. 1, and Fig. 3 a side elevation showing the position of the several parts of the windmill when the wind-wheel is pressed back and checked in its movement.

Similar letters indicate like parts in each of the drawings.

My improvement consists in a novel arrangement of friction-blocks immediately behind the wind-wheel, against which the wheel is pressed by the wind when blowing with violence, and which will then act as brakes to check and control the speed of its revolution; and, also, in the combination of a lever and weight with the rear end of the wheel-shaft, so as to counterbalance in a degree the pressure of the wind against the wheel, and determine the amount of force which shall suffice to press it back against the brakes.

The cost of manufacturing my self-regulating windmills is less than that of the usual kinds, and its efficiency is not impaired by its automatic regulating capacity.

The wind-wheel A of my improved windmill is made of any desired size, and with such form and character of sails as may be most approved. It is firmly secured upon the end of a shaft, B, Fig. 3, which is supported in journal-boxes formed in the opposite ends of a box or frame, C, pivoted upon the frame-work of a suitable tower, Y Y, so as to turn horizontally in any direction with freedom and ease. The bearings of the shaft are so extended as to allow the shaft to play or slide horizontally in the journal-boxes to a considerable degree, the amount of play being limited by collars or shoulders $d\ d$ upon the shaft, as seen in Figs. 2 and 3.

A crank, $b$, is formed upon the shaft, midway between its bearings in the box or frame C, to impart the necessary reciprocating movement to the pump-rod D, attached thereto, as shown in Fig. 2.

The vane E, required to keep the wheel to the wind, is secured to the end of an arm, M, extending rearwardly in a right line with the wheel-shaft B from the upper side of the bearing-box C, to which it is rigidly attached, and the rear end of the shaft B projects out from its journal-box immediately below this supporting-arm M of the vane, as shown in Figs. 2 and 3.

To obtain uniformity in the revolution of the wind-wheel A and shaft B, thus simply supported and adjusted, and to protect the same from violent or sudden gales, which would drive them at too high a speed and injure the machine, I place and secure a flat friction-ring or annular plate, G, of metal, (whose diameter is at least one-half that of the wind-wheel,) against the arms of the wheel upon the inner side thereof at equal distances from their axis.

Upon the front end of the bearing frame or box C, I secure firmly and rigidly four or more radial arms, H H, Fig. 1, and upon the front face of each extremity of these radial arms I so place friction-blocks K K, all of equal thickness, as that when the wind-wheel with its shaft is pushed back in its bearings the friction-ring G will strike and bear against these several blocks K K, as seen in Fig. 3.

As the shaft B is left free to slide or play, it is evident that without a counterbalance to the force of wind a breeze sufficient to turn the wheel would force it back against the blocks, arranged as described, and prevent its movement. To resist the pressure of the wind, therefore, against the wheel, and regulate the amount of force which shall be permitted to turn it without check upon its speed, I pivot a lever, O, in a slot formed in the arm M of the vane E, so that it shall swing vertically against the rear end of the shaft B, as shown in Figs. 2 and 3. The lower end of this lever plays between guides N N, which project rearwardly from the bottom of the box or frame C in a plane coincident with that of the arm M of the vane. A cord is attached to the free end of the lever, which passes thence over a pulley, S, pivoted between the guides N N at a point between the lever O and box C, and supports a weight, P, secured to its lower end. This weight is thus made to counterbalance the force of the wind, for, acting through the lever O upon the rear end of the shaft B, it carries and holds it forward, thus keeping the wind-wheel clear of the brake-blocks K K, as seen in Fig. 2. When, however, the pressure of the wind pushing backward upon the shaft is so great as to exceed that of the weight holding it forward, the friction ring or plate G will be pressed against the blocks, as seen in Fig. 3, which will act as brakes to prevent a too violent revolution of the wheel.

By lifting the weight P the revolution of the wheel may be arrested, and by adding to or diminishing this weight its movements may be easily regulated.

The bearing box or frame C, which supports the wind wheel and vane, may be pivoted upon any suitable frame-work.

Having thus fully described my invention, what I claim therein as new, and desire to secure by Letters Patent, is—

1. The combination and arrangement of the radial arms H H and the friction-blocks K K, so as to operate in conjunction with a friction ring or plate, G, upon the wind-wheel A, substantially in the manner and for the purpose herein set forth.

2. The combination of a swinging lever, O, and attached cord and weight P with the rear end of the sliding shaft B of the wind-wheel A, when arranged substantially in the manner and for the purpose herein set forth.

The foregoing specification of my improvement in windmills signed by me this 1st day of October, A. D. 1864.

LEWIS REESE.

In presence of—
ROBERT A. HEWS,
N. JONES.